US010266425B2

(12) United States Patent
Ryman et al.

(10) Patent No.: US 10,266,425 B2
(45) Date of Patent: Apr. 23, 2019

(54) LIQUID TREATMENT MODULE WITH A RECIRCULATION FLOW (71) Applicant: WALLENIUS WATER AB, Stockholm (SE)

(72) Inventors: Andre Ryman, Vasterhaninge (SE); Henrik Lagerstedt, Stockholm (SE); Staffan Strand, Stockholm (SE); Ulf Arbeus, Lidingo (SE)

(73) Assignee: Wallenius Water Innovation AB, Stockholm (SE)

( * ) Notice: Subject to any disclaimer, the term of this patent is extended or adjusted under 35 U.S.C. 154(b) by 0 days.

(21) Appl. No.: 15/568,159

(22) PCT Filed: Mar. 29, 2016

(86) PCT No.: PCT/SE2016/050256
§ 371 (c)(1),
(2) Date: Oct. 20, 2017

(87) PCT Pub. No.: WO2016/171601
PCT Pub. Date: Oct. 27, 2016

(65) Prior Publication Data
US 2018/0162749 A1    Jun. 14, 2018

(30) Foreign Application Priority Data
Apr. 23, 2015  (SE) ...................... 1550482

(51) Int. Cl.
C02F 1/32       (2006.01)
C02F 103/00     (2006.01)
C02F 103/16     (2006.01)

(52) U.S. Cl.
CPC ........ C02F 1/325 (2013.01); C02F 2103/008 (2013.01); C02F 2103/16 (2013.01);
(Continued)

(58) Field of Classification Search
CPC ...... C02F 1/00; C02F 1/30; C02F 1/32; C02F 1/325
(Continued)

(56) References Cited

U.S. PATENT DOCUMENTS 5,124,131 A    6/1992  Wekhof
5,625,194 A    4/1997  Stitzel et al.
(Continued)

FOREIGN PATENT DOCUMENTS

CN    101786715 A       7/2010
WO    WO-2006/100534 A1  9/2006

OTHER PUBLICATIONS

International Search Report for International Application No. PCT/SE2016/050256 dated Jun. 20, 2016.

Primary Examiner — Jason L McCormack
(74) Attorney, Agent, or Firm — Harness, Dickey & Pierce, P.L.C.

(57) ABSTRACT

A liquid treatment module (2), configured for ultraviolet (UV)-light treatment of a liquid (4) flowing through a first treatment chamber (6) defined as a first elongated circumferential hollow cavity (8) between an outer surface (10) of a first translucent inner sleeve (12) and an inner surface (16) of a first outer sleeve (18') configured to enclose said first translucent sleeve (12). The inner sleeve (12) is arranged to protect and include a UV-light treatment lamp (14). The module comprises a module inlet connection (20) configured to receive liquid to be treated and a module outlet connection (22) configured to expel liquid treated by the liquid treatment module. The module comprises: —first liquid flow guiding members (24') configured to guide and direct a liquid flow (26) from said module inlet connection (20) into said first treatment chamber (6), —second liquid flow guiding members (28') configured to guide and direct a liquid flow (30) from said first treatment chamber (6) into a second
(Continued)

treatment chamber (32'), and —third liquid flowing guiding members (34') configured to guide and direct a liquid recirculation flow (36) from said second treatment chamber (32') back into the first treatment chamber (6) again.

8 Claims, 5 Drawing Sheets

(52) U.S. Cl.
CPC .. *C02F 2201/324* (2013.01); *C02F 2201/328* (2013.01); *C02F 2201/3223* (2013.01); *C02F 2201/3227* (2013.01); *C02F 2201/3228* (2013.01); *C02F 2209/40* (2013.01)

(58) Field of Classification Search
USPC .......................... 250/436, 437, 438, 455.11
See application file for complete search history.

(56) References Cited

U.S. PATENT DOCUMENTS

| | | | |
|---|---|---|---|
| 5,626,768 A * | 5/1997 | Ressler | A23L 3/28 210/192 |
| 5,843,309 A * | 12/1998 | Mancil | C02F 1/325 210/205 |
| 7,425,272 B2 | 9/2008 | Butters et al. | |
| 2005/0156119 A1 | 7/2005 | Greene | |
| 2007/0181509 A1 | 8/2007 | Araiza et al. | |
| 2010/0314263 A1* | 12/2010 | Lean | C02F 9/00 205/751 |
| 2012/0241644 A1* | 9/2012 | Ben-David | C02F 1/325 250/436 |
| 2014/0255570 A1 | 9/2014 | Snowball | |

* cited by examiner

LIQUID TREATMENT MODULE WITH A RECIRCULATION FLOW

CROSS-REFERENCE TO RELATED APPLICATIONS

This application is a national phase under 35 U.S.C. § 371 of PCT International Application No. PCT/SE2016/050256 which has an International filing date of Mar. 29, 2016, which claims priority to Swedish Patent Application No. 1550482-2, filed Apr. 23, 2015, the entire contents of each of which are hereby incorporated by reference.

TECHNICAL FIELD

The present disclosure relates to a liquid treatment module for ultraviolet light treatment of a liquid, e.g. cutting liquid, ballast water, etc.

BACKGROUND

There are many applications where ultraviolet (UV) light sources are used for treating liquids. The applicant of the present application, Wallenius Water AB in Sweden, has developed and is selling water treatment equipment having a water purifier comprising an elongated tubular treatment chamber with an inlet and an outlet. In the center of the treatment chamber a generally tubular quartz glass is arranged and inside the quartz glass a UV source, such as a lamp capable of generating wavelengths in the UV region. Low pressure UV lamps offer great efficiency and find particular application e.g. in the disinfection of water. Examples of different types of low pressure lamps include e.g. ozone-free mercury low pressure lamps, mercury ozone-generating low pressure lamps, and U-shaped lamps which supply high power in a compact design.

The inner surface of the treatment chamber of the water treatment equipment may be covered with catalytic material, such as titanium dioxide, which catalysts promotes and increases the amount of treatment material. The treatment equipment also comprises a pumping device which pumps liquid from e.g. a tank into the treatment chambers.

The liquid that is treated often comprises particles and other solid matter other than the organisms that are killed off by the treatment units. These particles, as well as other residue from the killed off organisms, have a tendency to stick on the interior surfaces of treatment units. These particles, and other residue, aggregated on the surface are generally denoted as fouling.

UV light treatment, more specifically UV-light in combination with heat, sometimes provokes chemical reactions resulting in depositions on the interior surfaces, e.g. at the outer surface of the quarts sleeve. These resulting depositions are generally denoted as scaling. Often scaling is more difficult to remove from the surface than fouling. Furthermore, uneven and lumped deposits of fouling and/or scaling on the interior surfaces of the devices that are even more difficult to remove are a commonly occurring problem.

This means that in order to have an optimum efficiency of the treatment device the interior has to be cleaned regularly. According to one solution in the prior art, cleaning is performed by injecting cleaning liquids into the treatment chamber, where the cleaning liquids are developed for removing the fouling or scaling on the surfaces. However, even if they are efficient for removing fouling/scaling and the like deposits on the surfaces of the treatment chambers, they require that the treatment units are closed down during a period of time, whereby thus no treatment of liquid may be performed.

Similar arrangements are also described by others within the field as exemplified by the following.

U.S. Pat. No. 7,425,272 relates to a system for cleaning protective sleeves in UV decontamination systems. The disclosed system for cleaning the outer surface of a quartz sleeve is based on the recognition that providing a honing material (e.g. a photocatalytic slurry comprising $TiO_2$) with a predetermined abrasiveness through the annulus at high velocity works to remove aggregated particles from the outer surface. In U.S. Pat. No. 7,425,272 the linear velocity of a slurry material passing through the annulus during a cleaning process is about 1 m/s, and in one particular example it is stated that the velocity is at least 0.5 m/s.

Also U.S. Pat. No. 5,124,131 and U.S. Pat. No. 5,626,768 relate to UV-radiation treatment systems and methods where a liquid is moved along a UV-radiation source.

U.S. Pat. No. 5,625,194 relates to an apparatus for continuous cleaning of tubular lamp wells for UV-light producing lamps. A large number of small plastic pellets are dispersed in the reaction solution and maintained in turbulent motion by a stirrer in the reactor. The pellets frequently impact the outer surface of the tubular wells with sufficient momentum to prevent deposits of material from adhering on the tubular wells.

Hence, there is still a need in the art for an improved liquid treatment module which is less prone to suffer from problems associated with scaling and/or fouling building up on the interiors of the module during liquid treatment.

In addition there is a demand for an improved functionality of the treatment module to ensure that as much liquid as possible is treated, i.e. exposed, to a predefined lowest UV-light treatment dose.

SUMMARY

The above-mentioned objects are achieved, or at least mitigated, by the present invention according to the independent claim.

Preferred embodiments are set forth in the dependent claims.

One important aspect of the treatment module is to ensure that as much liquid as possible is treated, i.e. exposed, to a predefined lowest UV-light treatment dose. Thus, it must be possible to guarantee that specified treatment requirements are fulfilled, e.g. that essentially a major part of the liquid receives a UV-dose that is above a predetermined UV-light treatment dose threshold.

According to one aspect of the invention the treatment module comprises a first and a second treatment chamber through which chambers the liquid to be treated will flow. In order to achieve the prolonged treatment time period the module is provided with liquid flow guiding members that facilitates recirculation of the liquid within the module, i.e. the liquid may flow from the first treatment chamber into the second treatment chamber and then back into the first treatment chamber again.

More particularly, the liquid flow into the first treatment chamber is the basis for achieving the recirculation within the treatment chambers. A mixing zone is established in connection to the inlet of the liquid into the first treatment chamber where the flow rate of the liquid injected into the chamber is higher than the flow rate of the recirculated liquid.

This results in a pressure increase of the liquid that facilitates the recirculation.

According to one embodiment the treatment module is provided with two translucent sleeves together defining two treatment chambers; a first treatment chamber closest to the UV-lamp, and a second treatment chamber, surrounding and enclosing the first treatment chamber. The liquid that flows through the second treatment chamber receives UV-light from the lamp where the UV-light has passed through the first treatment chamber and the first outer sleeve. Thereby, the liquid will be exposed to UV-light during two passages, both when flowing through the first treatment chamber (high exposure) and then when flowing through the second treatment chamber (lower exposure). Thus, the liquid flowing through the treatment chambers will have a rather long treatment time which is advantageous in order to secure that the treatment requirements are fulfilled. A variation of this embodiment where no recirculation is provided but a long treatment time is achieved is also disclosed.

According to a further aspect abrasive particles are provided within the treatment chambers. The liquid flow rate in the first elongated circumferential hollow cavity brings abrasive particles for removing/preventing fouling/scaling on surfaces within the treatment chambers, and in particular in the first treatment chamber.

The liquid flow rate into the first treatment chamber is preferably higher than 3 m/s, preferably approximately 5 m/s, but also lower flow rates may be used. The degradation of the surfaces of the translucent sleeves is thereby considerably reduced, i.e. fouling and/or scaling is prevented or removed by particles, e.g. abrasive particles. Advantageously, the abrasive particles include titanium dioxide ($TiO_2$).

Filter members are provided and being configured to prevent the particles from leaving the module.

DETAILED DESCRIPTION

The present invention will now be described in detail with references to the appended drawings. Throughout the figures like or similar items have the same reference signs.

It should be noted that the illustrations in the figures are schematic as the intention is to illustrate the basic structure of the module, e.g. the proportion between various parts is different in a real treatment module in that the vertical height probably is considerably larger than the outer diameter of the module.

Figure 1:
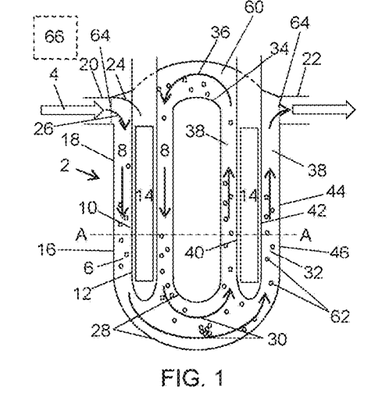
FIG. 1 shows a cross-sectional side view schematically illustrating the liquid treatment module according to a first embodiment of the present invention.
Figure 5:
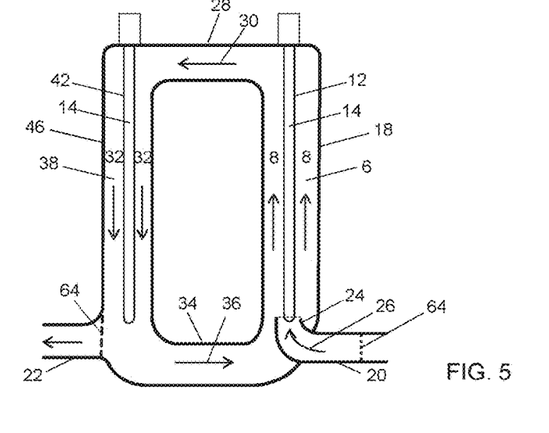
FIG. 5 shows a cross-sectional side view schematically illustrating the liquid treatment module according to a variation of the first embodiment of the present invention.
Figure 8:
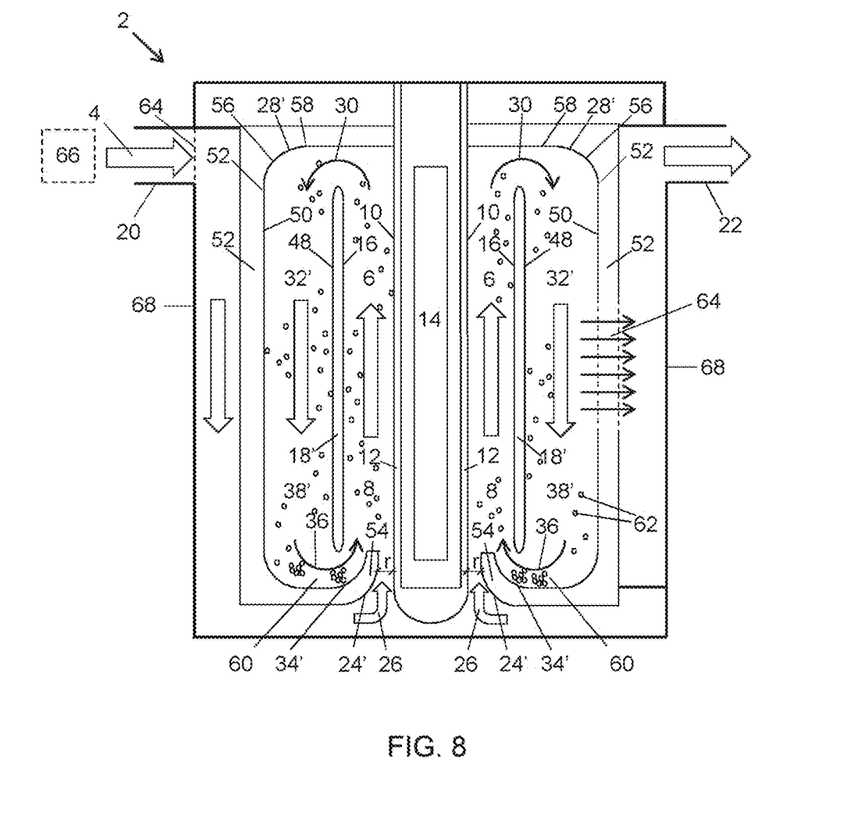
FIG. 8 shows a cross-sectional side view schematically illustrating the liquid treatment module according to a third embodiment of the present invention.

First, the liquid treatment module 2 will be generally described with references to the different embodiments illustrated in the figures, and in particular FIGS. 1, 5 and 8. The invention relates to a liquid treatment module 2, configured for ultraviolet (UV)-light treatment of a liquid 4 flowing through a first treatment chamber 6 defined as a first elongated circumferential hollow cavity 8 between an outer surface 10 of a first translucent inner sleeve 12 and an inner surface 16 of a first outer sleeve 18, 18' configured to enclose the first translucent sleeve 12. The first translucent inner sleeve 12 is arranged to protect and include a UV-light treatment lamp 14. The UV-light treatment lamp 14 is preferably tube-shaped, but any shape or type of UV-lamp may be used for emitting UV-light applicable for UV-light treatment.

The module comprises a module inlet connection 20 configured to receive liquid to be treated and a module outlet connection 22 configured to expel liquid treated by the liquid treatment module. The liquid may be working liquid, ballast water, or any liquid that requires UV-light treatment.

One important aspect of the treatment module is to achieve a prolonged UV-light treatment period which is achieved by providing recirculation within the module between the first treatment chamber and a second treatment chamber.

Thus, the liquid to be treated have a longer exposure to UV-light compared to apparatuses where only one treatment chamber is provided, in that, in the treatment module the liquid is subjected to UV-light treatment in both treatment chambers.

To achieve this object the module comprises first, second and third liquid flow guiding members to guide the liquid flow into the first treatment chamber, out from the first treatment chamber into the second treatment chamber and then back into the first treatment chamber.

More particularly, first liquid flow guiding members 24, 24' are provided configured to guide and direct a liquid flow 26 from the module inlet connection 20 into the first treatment chamber 6. Second liquid flow guiding members 28, 28' are provided configured to guide and direct a liquid flow 30 from the first treatment chamber 6 into the second treatment chamber 32, and third liquid flowing guiding members 34, 34' configured to guide and direct a liquid recirculation flow 36 from the second treatment chamber 32, 32' back into the first treatment chamber 6 again.

The mixing zone, where the liquid 4 is injected into the first treatment chamber and where the injected flow meets the recirculation flow, is approximately indicated by arrow 26. The higher flow rate of the injected liquid in comparison to the recirculation flow 36 is the basis for achieving the recirculation.

Figure 2:
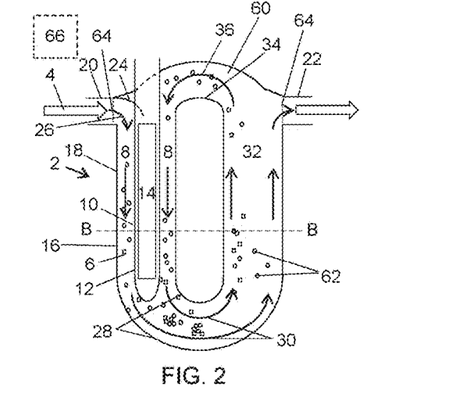
FIG. 2 shows a cross-sectional side view schematically illustrating the liquid treatment module according to a second embodiment of the present invention.

A first and a second embodiment of the present invention are illustrated in FIGS. 1 and 2, respectively. In addition cross-sectional views along A-A in FIG. 1, and B-B in FIG. 2 are shown in FIGS. 3 and 4, respectively.

With references to FIG. 1, the second treatment chamber 32 is defined as a second elongated circumferential hollow cavity 38 between an outer surface 40 of a second translucent inner sleeve 42 and an inner surface 44 of a second outer sleeve 46 configured to enclose the second translucent sleeve 42. The translucent inner sleeve 42 is arranged to protect and include a UV-light treatment lamp 14. The second treatment chamber is also provided with a connection to the module outlet connection 22.

The second embodiment illustrated in FIG. 2 differs from the first embodiment only with regard to that the first treatment chamber is provided with a UV-light treatment lamp and the second treatment chamber is used as a return channel for flowing the liquid back into the first treatment chamber via a recirculation connection 60.

Figure 3:
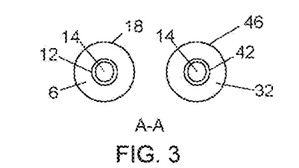
FIG. 3 is a cross-sectional view along A-A in FIG. 1.
Figure 4:
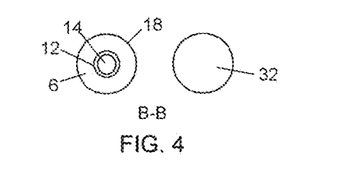
FIG. 4 is a cross-sectional view along B-B in FIG. 2.

The cross-sectional views A-A and B-B illustrated in FIGS. 3 and 4, respectively, show one example of the geometrical shapes of the treatment chambers. Thus, the cross-section of a treatment chamber has typically a circular shape.

The treatment module according to the first and second embodiment is preferably provided with an outer housing (not shown) that encloses the treatment chambers and thereby is a robust outer protective shell for the module.

A variation of the first embodiment is illustrated in FIG. 5.

More particularly, first liquid flow guiding members 24 are provided and being configured to guide and direct a liquid flow 26 from the module inlet connection 20 into the first treatment chamber 6. As clearly illustrated the first liquid flow guiding members 24 is shaped to direct the liquid flow into the first treatment chamber and specifically close to the first translucent inner sleeve 12. Thus, the advantage achieved by the structure and shape of the first guiding members 24 is to avoid any liquid flow into the third liquid flow guiding members 34 from the first guiding members 24. Second liquid flow guiding members 28 are provided configured to guide and direct a liquid flow 30 from the first treatment chamber 6 into the second treatment chamber 32, and third liquid flowing guiding members 34 configured to guide and direct a liquid recirculation flow 36 from the second treatment chamber 32 back into the first treatment chamber 6 again. The second treatment chamber 32 is defined as a second elongated circumferential hollow cavity 38 between an outer surface of a second translucent inner sleeve 42 and an inner surface of a second outer sleeve 46 configured to enclose the second translucent sleeve 42. The second translucent inner sleeve 42 is arranged to protect and include a UV-light treatment lamp 14. The second treatment chamber is also provided with a connection to the module outlet connection 22.

With references to FIGS. 6-9 the third embodiment of the present invention will now be described. Herein it is referred to the above general description related to all embodiments.

According to this third embodiment the first outer sleeve 18' is translucent, and the second treatment chamber 32' is defined as a second elongated circumferential hollow cavity 38' between an outer surface 48 of the translucent first outer sleeve 18' and an inner surface 50 of a housing member 52, and wherein the liquid is subjected to UV-light treatment in both treatment chambers.

As a variation of this third embodiment the first outer sleeve 18' is not translucent. In particular this variation is applicable when treating opaque liquids, e.g. cutting liquids, as the effect of the UV-light only exists close to the surface of the first translucent sleeve 12. Thus, according to this variation the liquid is subjected to the UV-light treatment only in the first treatment chamber.

The treatment chambers 6, 32' may be vertically arranged as illustrated in the figures, but other orientations are naturally possible. The first liquid flow guiding members 24' are arranged at a first part, or a lower part if vertically arranged, of the treatment chambers, and that the second liquid flow guiding members 28' are arranged at a second part, or an upper part if vertically arranged, of the treatment chambers. To guide the liquid the first liquid flow guiding members 24' comprise a guiding part 54 configured to direct the flow in a first direction, or an upward direction. More specifically the guiding part is essentially annular and encircles a part of the first translucent inner sleeve 12 such that a radial distance r is defined for the liquid flow to flow close to the outer surface of the first translucent inner sleeve into the first treatment chamber 6.

The second liquid flow guiding members 28' comprise a guiding surface 56 displaying a smooth curve, in a plane along a longitudinal axis of the lamp, having an essentially horizontal part 58, provided that the module is vertically arranged, close to an upper part of the inner sleeve to an essentially vertical part where the guiding surface meets the inner surface of the housing member 52.

An outer housing 68 is provided being an outer protective enclosure of the module and that also defines fluid channels inside the module. The outer housing is provided with the module inlet connection 20 and an outlet connection 22.

A recirculation connection 60, being embodied by the third liquid flow guiding members 34', is provided and being configured to direct and guide the liquid recirculation flow 36 from the second treatment chamber 32' into the first treatment chamber 6 again. The third liquid flow guiding members comprise a guiding surface displaying a smooth curve leading the liquid flow back into the first treatment chamber.

Figure 6:
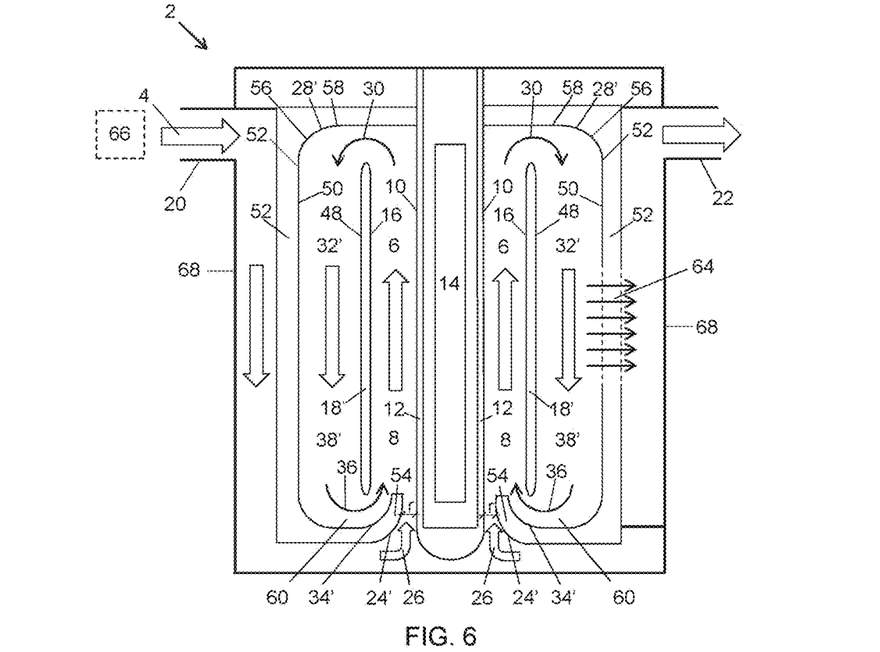
FIG. 6 shows a cross-sectional side view schematically illustrating the liquid treatment module according to a third embodiment of the present invention.
Figure 7:
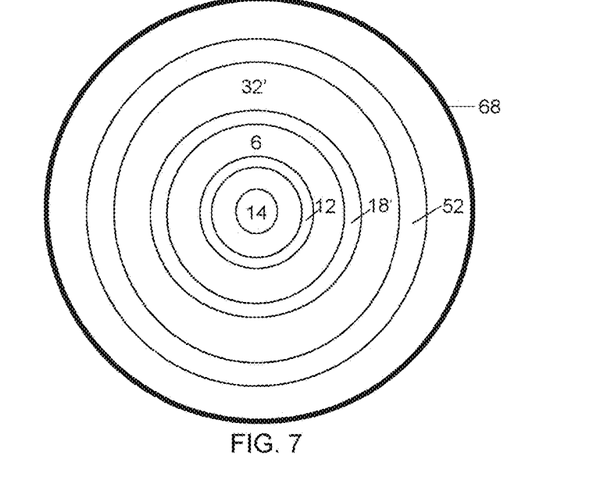
FIG. 7 shows a cross-sectional view from above schematically illustrating the liquid treatment module according to a third embodiment of the present invention.

With references to FIG. 6 the translucent first inner sleeve 12 and the first outer sleeve 18' are essentially concentrically arranged with regard to its longitudinal axes. In addition the housing member 52 is also concentrically arranged with regard to sleeve 12 and sleeve 18'.

Thus, if vertically arranged, the liquid flow enters the inner treatment chamber from below and close to the outer surface 10 of the inner sleeve 12. The liquid flows upwards, which is indicated by the arrows in the first treatment chamber. When the liquid reaches the second liquid flow guiding members it is forced outwards into the second treatment chamber where it flows downwards. The liquid may continue into the first treatment chamber again or may flow out from the second treatment chamber via an opening, preferably provided with a filter member 64 and out from the treatment module via the outlet connection 22.

Preferably, and relevant for all embodiments, particles 62, and preferably abrasive particles, are provided within the first and second treatment chambers. The particles being capable to flow with the liquid through the treatment chambers, and being capable of being recirculated within the chambers. In particular and preferably the particles comprises abrasive particles capable of removing fouling/scaling at surfaces of the treatment chambers. A filter member 64 is provided, at least in connection with the module outlet connection 22, configured to prevent the particles from escaping from the treatment chambers, but allowing liquid to flow out from the chambers, through the module outlet connection 22.

The size, shape, density, concentration, hardness and constitution of the particles are dependent upon the specific application of the liquid treatment module.

The size of the particles is advantageously within the range of 0.5-3 mm, and they may have both rounded shapes or more cornered or edged shapes. The size, shape and density are related to the flow rate through the chambers. For example, if the flow rate is low, e.g. 1 m/s, the size and density must be lower in comparison if a higher flow rate is applied. The hardness of the particles is preferably lower than the hardness of the surfaces of the treatment chambers.

The particles are preferably made from a photocatalytic material, which is advantageous in order to improve the treatment effect. In one embodiment the abrasive particles comprises titanium dioxide ($TiO_2$). Titanium dioxide, particularly in its anatase form, is a photocatalyst under ultraviolet (UV) light. It is also possible to provide a coated particle where the core is made from one material, and a coating layer from another material. The amount of particles may be expressed in relation to the liquid volume within the treatment module, and according to one not limiting example the volume of the particles is approximately 1/100 of the liquid volume.

All particles may be the same type, or a mixture of different types of particles may be used, e.g. with regard to shape, type of material, etc.

Thus, it is possible to tailor the effect achieved by the particles by varying the above parameters with regard to the specific use of the treatment module, e.g. by providing a mixture of abrasive particles and particles having photocatalytic effects.

Generally, the shapes of the first, second and third liquid flow guiding members 24, 24', 28, 28', 34, 34' are such that the flow of particles are optimal for removing scaling/fouling.

Specifically the first liquid guiding members 24, 24' have to direct the flow of particles such that the particles are led to flow close to the outer surface 10 of the first translucent inner sleeve which is the surface subjected to highest UV-light intensity, and thus being most prone to build up scaling/fouling.

This is achieved in the third embodiment by providing a small circumferential radial opening close to the outer surface of the inner sleeve 12 into the first treatment chamber where the flow rate is high which bring particles within the chamber to flow close to the surface.

The module is configured to be connected to a liquid pump unit 66 arranged to pump the liquid such that it has a flow rate through the first treatment chamber. The module may be used in a wide range of flow rates where the flow rate is related to the particular use. In one exemplary application the flow rate is approximately 1 m/s. In another application the flow rate is higher than a predetermined flow rate threshold, e.g. 3 m/s and more preferred approximately 5 m/s. This high flow rate is advantageous in order to reduce or even eliminate the formation of fouling or scaling on the surfaces inside the treatment chambers, and in particular the outer surface 10 of the inner sleeve 12.

FIG. 8 shows a cross-sectional side view schematically illustrating the liquid treatment module according to one embodiment of the present invention. The features of this embodiment correspond to the features described in connection with FIGS. 5 and 6 and it is referred to the above description of those figures. In the illustrated embodiment in FIG. 8, the particles 62, e.g. the abrasive particles, are provided within the first and second treatment chambers. The particles are capable of flowing with the liquid through the treatment chambers to remove fouling/scaling at surfaces of the translucent first inner and outer sleeves. As mentioned above a filter member 64 is provided configured to prevent the particles from escaping from the treatment chambers, but allowing liquid to flow out from the chambers, through a module outlet connection 22. The filter member is e.g. a mesh having openings through which the particles cannot escape.

The shapes of the first, second and third flow guiding members are such that the flow of particles is optimal for removing scaling/fouling from the surfaces inside the treatment chambers and in particular from the surfaces of the translucent sleeves.

UV-light promotes the formation of scaling and/or fouling. Due to the fact that the UV-light intensity is considerably higher through the inner sleeve 12 than through the first outer sleeve 18' the scaling or fouling is in particular formed at the outer surface of the inner sleeve. By providing abrasive particles together with a rather high flow rate the prevention and/or elimination of scaling/fouling is achieved.

As illustrated in FIG. 8 the first flow guiding members 24' are such that the inflow of liquid into the first treatment chamber 6 creates an underpressure that brings the particles in a first direction, or an upward direction, provided that the module has a vertical orientation, close to the outer surface of the inner sleeve. The particles will then prevent the formation of fouling/scaling. The abrasive particles will preferably follow the liquid flow into the second treatment chamber where it follows the liquid flow downwards.

Figure 9:
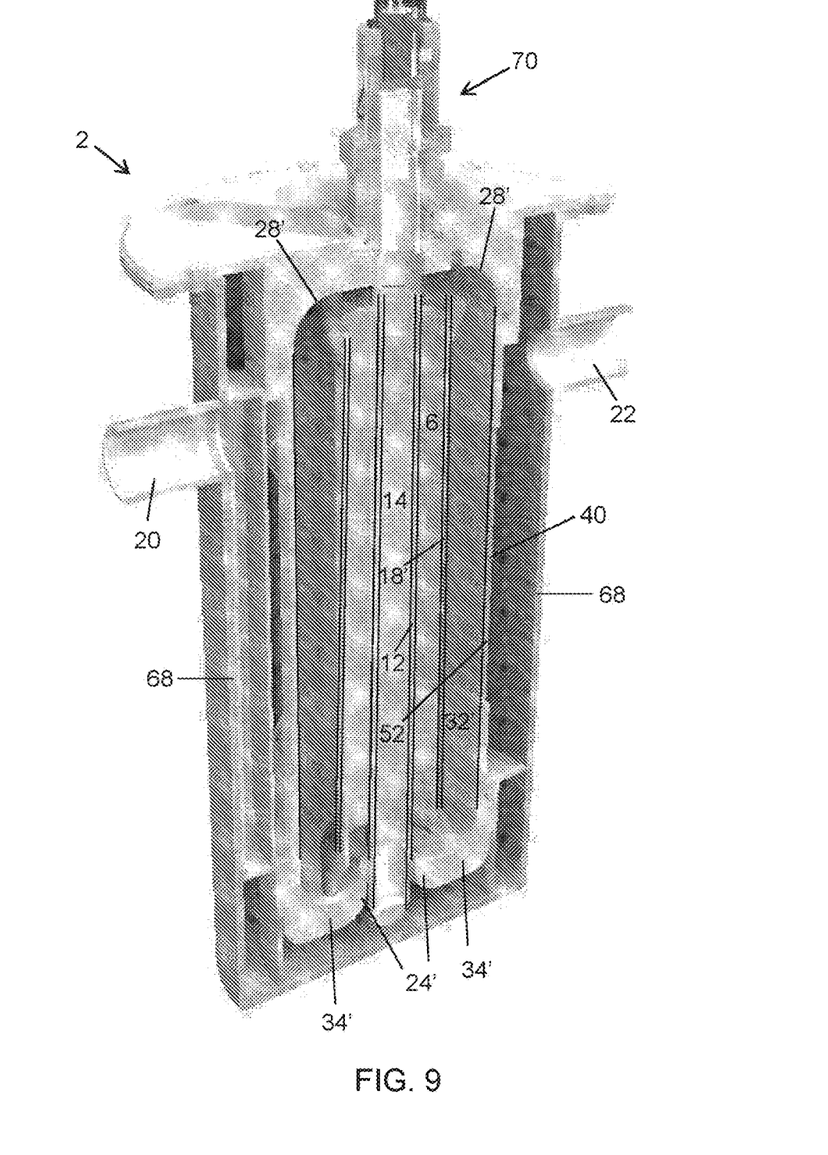
FIG. 9 shows a cross-sectional perspective side view illustrating the liquid treatment module according to a third embodiment of the present invention.

FIG. 9 shows a cross-sectional perspective side view illustrating the liquid treatment module according to the present invention.

The treatment module 2 is preferably provided with a robust outer housing 68 which e.g. may be at least partly submerged into the liquid to be treated. Mounting and connection members 70 are provided at an upper part of the housing. The mounting and connection members facilitate access to the UV-lamp 14 to provide for e.g. electrical connections. The first translucent inner sleeve 12, and the first outer sleeve 18', that together with the housing member 52 define the first and second treatment chambers 6, 32' are illustrated in the figure. The liquid to be treated enters the module via the inlet connection 20 and exits through the outlet connection 22. The filter member 64 is provided to prevent abrasive particles from escaping from the treatment module and a filter member is preferably arranged both in connection with inlet and the outlet connections.

Figure 10:
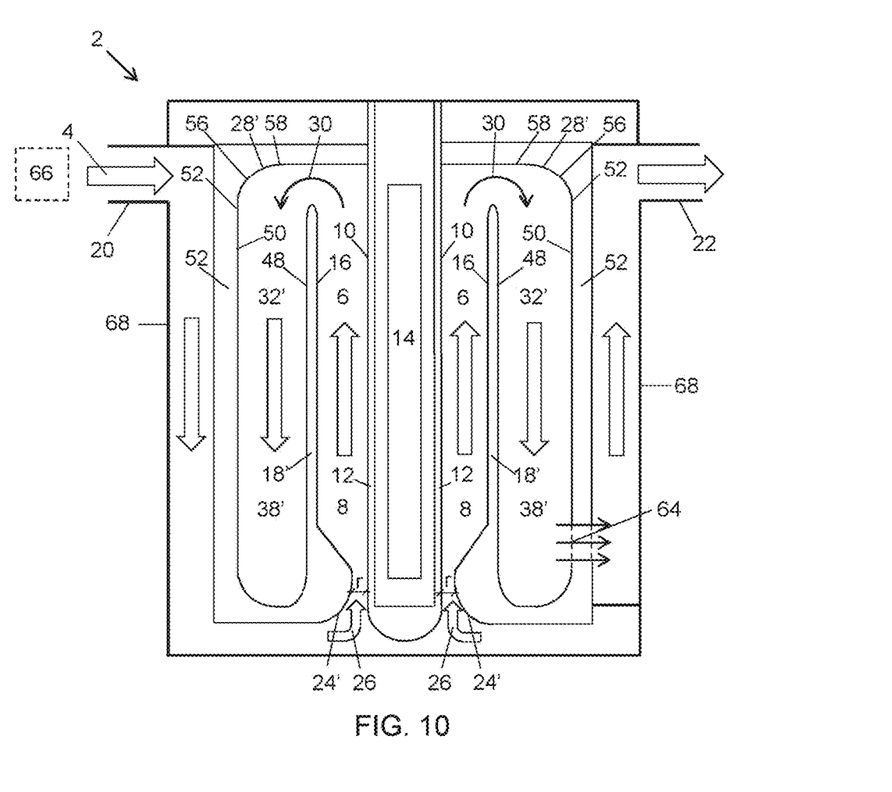
FIG. 10 shows a cross-sectional side view schematically illustrating the liquid treatment module according to a variation of the third embodiment of the present invention.

FIG. 10 shows a cross-sectional side view of an alternative embodiment of the present invention. This embodiment is based upon the embodiment disclosed in FIGS. 6 and 7, but without the recirculation aspect in that sense as described above. A prolonged treatment time period is achieved by this embodiment by providing circulation of liquid to be treated first through a first treatment chamber and then through a second treatment chamber. Thus, with references to FIG. 10 a liquid treatment module 2 is provided, configured for ultraviolet (UV)-light treatment of a liquid 4 flowing through a first treatment chamber 6 defined as a first elongated circumferential hollow cavity 8 between an outer surface 10 of a first translucent inner sleeve 12, arranged to protect and include a UV-light treatment lamp 14, and an inner surface 16 of a first outer sleeve 18' configured to enclose the first translucent sleeve 12. The module comprises a module inlet connection 20 configured to receive liquid to be treated and a module outlet connection 22 configured to expel liquid treated by the liquid treatment module.

The module comprises first liquid flow guiding members 24' configured to guide and direct a liquid flow 26 from the module inlet connection 20 into the first treatment chamber 6. Second liquid flow guiding members 28' are provided configured to guide and direct a liquid flow 30 from the first treatment chamber 6 into a second treatment chamber 32'. The second treatment chamber 32' is defined as a second elongated circumferential hollow cavity 38' between an outer surface 48 of the first outer sleeve 18', which is translucent, and an inner surface 50 of a housing member 52. Thereby the liquid is subjected to UV-light treatment in both treatment chambers which is advantageous in order to achieve a long treatment period. The liquid is expelled from the second treatment chamber via an optional filter member 64 and the module outlet connection 22.

Further features of the first and second guiding members, and other details illustrated in FIG. 10, are defined and discussed above in the description in relation to FIG. 6.

In order to improve the UV-light treatment of the liquid one or many surfaces of the treatment module subjected to UV-light emission may be inherently UV-light reflective or may be covered by a UV-light reflecting coating in order to further increase the UV-light emission of the liquid. In particular the inner surface 16 of the first outer sleeve 18, 18' is inherently UV-light reflective or comprises a UV-light reflecting coating. This is applicable to many of the embodiments disclosed above, except for a variant of the third embodiment where the first outer sleeve 18' is made from a translucent material.

The present invention is not limited to the above-described preferred embodiments. Various alternatives, modifications and equivalents may be used. Therefore, the above embodiments should not be taken as limiting the scope of the invention, which is defined by the appending claims.

REFERENCE SIGNS 2 liquid treatment module
4 liquid
6 first treatment chamber
8 first elongated circumferential hollow cavity
10 outer surface
12 first translucent inner sleeve
14 UV-light treatment lamp
16 inner surface
18, 18' first outer sleeve
20 module inlet connection
22 module outlet connection
24, 24' first liquid flow guiding members
26 liquid flow
28, 28' second liquid flow guiding members
30 liquid flow
32, 32' second treatment chamber
34, 34' third liquid flow guiding members
36 liquid recirculation flow
38 second elongated circumferential hollow cavity
40 outer surface
42 second translucent inner sleeve
44 inner surface
46 second outer sleeve
48 outer surface
50 inner surface
52 housing member
54 guiding part
56 guiding surface
58 horizontal part
60 recirculation connection
62 abrasive particles
64 filter member
66 pump unit
68 outer housing
70 mounting and connection members

The invention claimed is:

1. A liquid treatment module, configured to enable ultraviolet (UV)-light treatment of a liquid flowing through a first treatment chamber defined as a first elongated circumferential hollow cavity between an outer surface of a first translucent inner sleeve and an inner surface of a first outer sleeve configured to enclose the first translucent inner sleeve, the first translucent inner sleeve configured to protect and include a UV-light treatment lamp, the liquid treatment module comprising:

a module inlet connection configured to receive the liquid into the liquid treatment module to be treated;

a module outlet connection configured to expel the liquid subsequent to treatment of the liquid by the liquid treatment module;

a guiding part configured to guide and direct a first liquid flow of the liquid from the module inlet connection into the first treatment chamber;

a guiding surface configured to guide and direct a second liquid flow of the liquid from the first treatment chamber into a second treatment chamber; and a separate guiding surface configured to guide and direct a liquid recirculation flow of the liquid from the second treatment chamber back into the first treatment chamber again to establish recirculation between the first treatment chamber and the second treatment chamber within the liquid treatment module; and a recirculation connection configured to direct and guide the liquid recirculation flow of the liquid from the second treatment chamber into the first treatment chamber again, wherein a mixing zone is established in connection to the module inlet connection where an injected flow of the liquid meets the liquid recirculation flow of the liquid, wherein the liquid treatment module further includes particles within the first treatment chamber and the second treatment chamber, the particles configured to flow with the liquid through the first treatment chamber and the second treatment chamber, the particles including abrasive particles configured to remove
fouling at surfaces of the first treatment chamber and the second treatment chamber,
scaling at the surfaces of the first treatment chamber and the second treatment chamber, or
fouling and scaling at the surfaces of the first treatment chamber and the second treatment chamber, wherein the liquid treatment module further includes a filter member between the second treatment chamber and the module outlet connection, the filter member further between the recirculation connection and the module outlet connection, the filter member configured to prevent the particles from escaping from the first treatment chamber and the second treatment chamber through the module outlet connection, such that the particles recirculate between the first treatment chamber and the second treatment chamber with the liquid recirculation flow, the filter member further configured to allow the liquid to flow out from the first treatment chamber and the second treatment chamber through the module outlet connection.

2. The liquid treatment module according to claim 1, wherein the second treatment chamber is a second elongated circumferential hollow cavity between an outer surface of a second translucent inner sleeve and an inner surface of a second outer sleeve configured to enclose the second translucent inner sleeve, the second translucent inner sleeve configured to protect and include a separate UV-light treatment lamp.

3. The liquid treatment module according to claim 1, wherein the second treatment chamber is a second elongated circumferential hollow cavity between an outer surface of the first outer sleeve and an inner surface of a housing member.

4. The liquid treatment module according to claim 3, wherein the first outer sleeve is translucent, and the liquid treatment module is configured to subject the liquid to UV-light treatment in both the first treatment chamber and the second treatment chamber.

5. The liquid treatment module according to claim 1, wherein the inner surface of the first outer sleeve is inherently UV-light reflective or includes a UV-light reflecting coating.

6. The liquid treatment module according to claim 3, wherein the guiding part is at a first part of the first treatment chamber and the second treatment chamber, and the guiding surface is at a second part of the first treatment chamber and the second treatment chamber, and the second part is opposite the first part in the liquid treatment module.

7. The liquid treatment module according to claim 6, wherein the guiding part is configured to direct the first liquid flow in a first direction, and the guiding part is essentially annular and encircles a part of the first translucent inner sleeve such that a radial distance r of the first liquid flow from the outer surface of the first translucent inner sleeve into the first treatment chamber is defined by the guiding part.

8. The liquid treatment module according to claim 1, wherein the translucent first inner sleeve and the first outer sleeve are essentially concentrically arranged around a same longitudinal axis.

* * * * *